United States Patent [19]
Refregier et al.

[11] Patent Number: 5,214,716
[45] Date of Patent: May 25, 1993

[54] DEVICE FOR THE RECOGNITION OF SEQUENCES IN A MULTIDIMENSIONAL SIGNAL

[75] Inventors: Philippe Refregier, Palaiseau; Dominique Potier, Sevres; Francois Micheron, Gif S/Yvette, all of France

[73] Assignee: Thomson-CSF, Puteaux, France

[21] Appl. No.: 662,624

[22] Filed: Feb. 28, 1991

[30] Foreign Application Priority Data

Mar. 13, 1990 [FR] France .................. 90 03170

[51] Int. Cl.$^5$ .............................................. G06K 9/64
[52] U.S. Cl. ........................................ 382/42; 382/41
[58] Field of Search .................. 382/1, 21, 30, 34, 41, 382/42, 48; 364/728.03

[56] References Cited

U.S. PATENT DOCUMENTS

| | | | |
|---|---|---|---|
| 3,993,976 | 11/1976 | Ginsburg | 382/41 |
| 4,241,329 | 12/1980 | Bahler et al. | 382/41 |
| 4,259,661 | 3/1981 | Todd | 382/42 |
| 4,977,604 | 12/1990 | Chabries et al. | 382/42 |
| 4,998,286 | 3/1991 | Tsujiuchi et al. | 382/42 |

FOREIGN PATENT DOCUMENTS

| | | |
|---|---|---|
| 0063765 | 11/1982 | European Pat. Off. . |
| 0106534 | 4/1984 | European Pat. Off. . |
| 2029994 | 3/1980 | United Kingdom . |

*Primary Examiner*—Jose Couso
*Attorney, Agent, or Firm*—Oblon, Spivak, McClelland, Maier & Neustadt

[57] ABSTRACT

The disclosure relates to the recognition of sequences of multidimensional images and, notably, of image signals. The disclosed device includes, for each of said sequences to be recognized, a first circuit for the correlation of vectors representing the signal with a masking vector determined from the vectors representing the sequence to be recognized, producing a series of values corresponding to the degree of similarity of the two correlated vectors, a second circuit for the correlation of a sequence of the series of values with a reference sequence determined from the vectors forming said sequence to be recognized, producing values that correspond to the degree of similarity of the two correlated sequences, and a circuit for deciding on the validity of the recognition, by comparison of the values corresponding to the degree of similarity of the two correlated sequences with a threshold value.

8 Claims, 1 Drawing Sheet

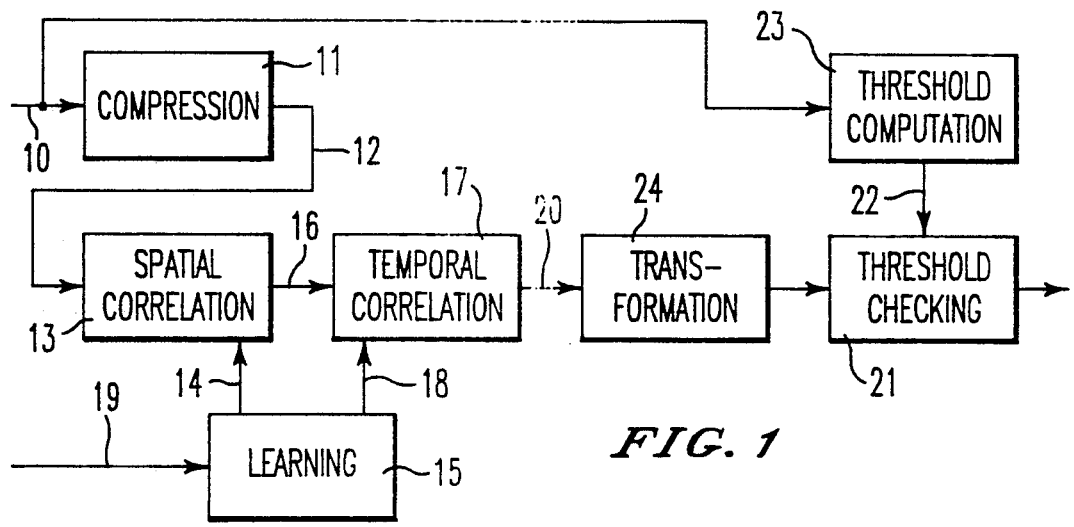
*FIG. 1*
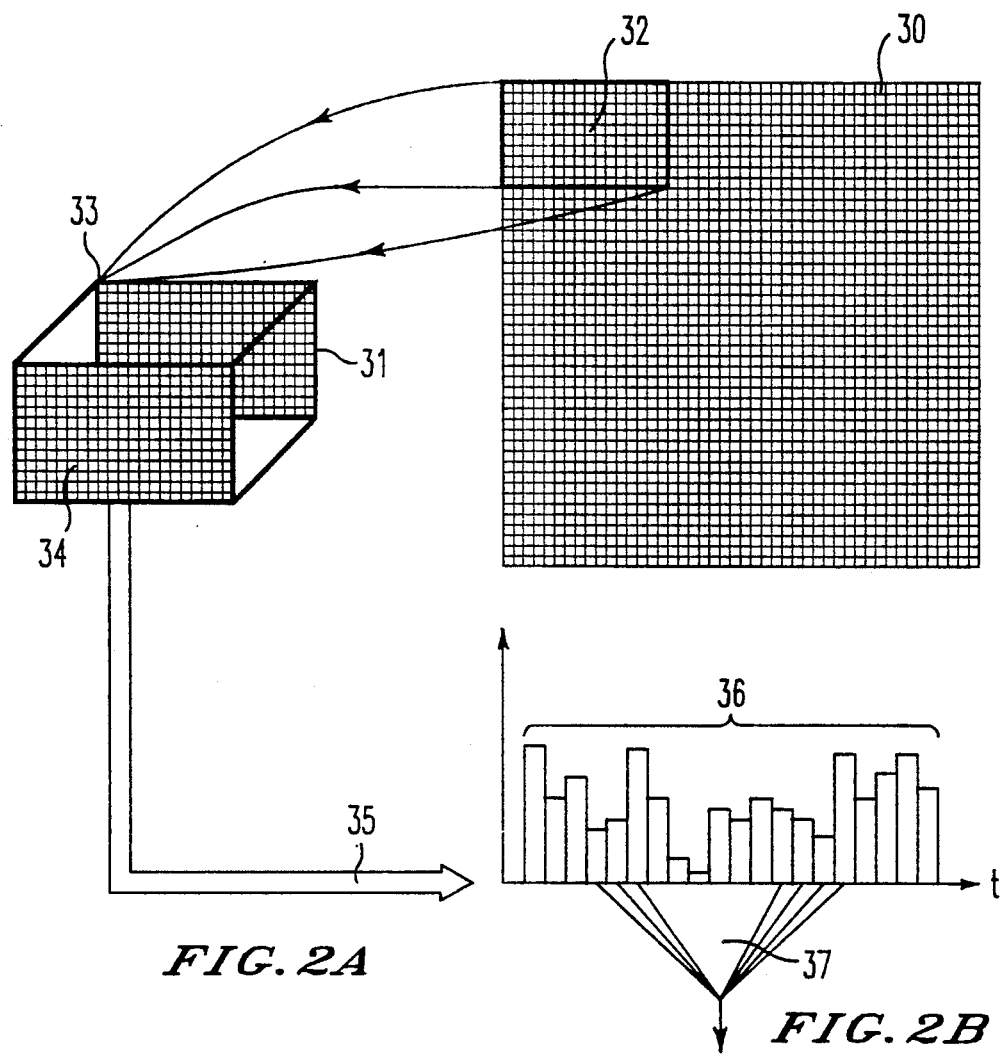
*FIG. 2A*
*FIG. 2B*

DEVICE FOR THE RECOGNITION OF SEQUENCES IN A MULTIDIMENSIONAL SIGNAL

BACKGROUND OF THE INVENTION

1. Field of the Invention

The field of the invention is that of the recognition of sequences of multidimensional signals, and notably sequences of image signals.

The term "multidimensional signals" is understood to mean the signals constituted by multidimensional elements or vectors. In the case of image signals, each image is a signal vector.

The invention can be applied, for example, to the automatic detection of a given sub-sequence of images in a sequence of images broadcast by a video program, enabling automatic control of selective recording operations. It can also be used as a device for obtaining access to the memory of a bank of images through the contents.

The invention can also find many applications in the fields of image processing and automatic vision, for example in robotics.

More generally, the invention can be applied to the recognition of all types of multidimensional signals, such as the time-frequency spectra of acoustic signals, radar signals or multisensor signals.

2. Description of the Prior Art

There are many known methods for the detection of a signal sequence of which there is a priori knowledge. The most commonly used technique is that of linear filtering, or of correlation according to a given standard. More precisely, when the detection does not take account of the properties of invariance, notably in rotation and in scale, the appropriate filtering technique is the one most commonly used in signal processing.

However, when the signal to be analyzed is crammed with information, for example in the case of video images, corresponding to vectors with large dimensions, the direct application of the linear filtering technique is very costly in computing time. Furthermore, the memory necessary to save the characteristics of the filter is substantial in this case.

A simpler method, in terms of the criteria of computing complexity and memory size needed, consists in carrying out a compression of the signal vector to be analyzed, before filtering. This compression has to be simple, in order to enable real-time processing. Thus, in the case of a high-definition image, it is possible to define sub-images with low resolution, of some tens by some tens of pixels, for example by taking averages of values within groups of pixels of the high-definition image.

This transformation, which is independent of the initial vector, inevitably results in a loss of information and, hence, in a loss of discrimination.

This drawback can be overcome by the simultaneous filtration, or correlation, of several vectors of the analyzed sequence. However, this leads to a major increase in the requisite computing power and memory size.

The invention is aimed at overcoming these drawbacks.

More precisely, the invention is aimed at providing a device for the recognition of sequences of multidimensional signals having high performance qualities of discrimination.

A complementary aim of the invention is to provide a device such as this, requiring filtering or correlation means of low complexity, notably as regards computing power and memory size.

Another aim of the invention is to provide a device such as this that costs little and can therefore be applied to products for mass consumption.

Another aim of the invention is to provide a device such as this that is easily programmable, i.e. a device that enables the swift modification of the sequence or sequences to be recognized.

SUMMARY OF THE INVENTION

These aims, as well as others that will appear here below, are achieved by means of a device for the recognition of sequences in a signal produced continuously and constituted by multidimensional vectors comprising, for each of said sequences to be recognized, first means for the correlation (in the broad sense of the term) of vectors representing said signal with a masking vector determined from the vectors representing said sequence to be recognized, producing a series of values corresponding to the degree of similarity of the two correlated vectors, second means for the correlation of a sequence of said series of values with a reference sequence determined from the vectors forming said sequence to be recognized, producing values that correspond to the degree of similarity of the two correlated sequences, and means for deciding on the validity of the recognition, by comparison of said values corresponding to the degree of similarity of the two correlated sequences with a threshold value.

In this way, the device of the invention achieves, in a cascaded manner, a spatial recognition and a temporal recognition of the sequence to be recognized.

Advantageously, said vectors representing said signal are given by information compression means, from said constituent vectors of said signal.

In a particular embodiment of the invention, said information compression means act by the obtaining of averages.

Preferably, the first correlation means and/or the second correlation means include means for the computation of an Euclidean norm.

In this case, the device of the invention is a non-linear device. The greater complexity of the computations as compared with those in a linear device i easily compensated for by the reduced number of operations required.

In an advantageous embodiment of the invention, the device includes means for the adapting of said threshold value to the permissible noise level.

The device may also include means for the transformation of said degree of similarity, for example as a function of the maximum threshold value.

Advantageously, the device of the invention includes means for the determining of said masking vector and/or said reference sequence, using a learning rule that minimizes the resistance to noise.

Preferably, said means for the determining of said masking vector include means to obtain the average of said vectors representing said sequence to be recognized, and said means for the determining of said reference sequence include means for the correlation of each of said vectors representing said sequence to be recognized with said masking vector.

This relatively simple learning process enables the device to be made easily programmable.

BRIEF DESCRIPTION OF THE DRAWING

Other characteristic and advantages of the invention shall appear from the following description of a preferred embodiment of the invention, given as a non-restrictive example, and from the appended drawing, wherein:

FIG. 1 shows a block diagram of an image sequence recognition device according according to the invention;

FIGS. 2A-B gives a schematic view of the processing of a sequence of images in the device of FIG. 1.

DETAILED DESCRIPTION OF THE INVENTION

The embodiment, given as a preferred example, concerns the detection of known sub-sequences of images produced continuously. For example, a device such as this may be applied to a video recording programming system.

FIG. 1 shows a block diagram of a device such as this.

Each of the received images 10 is initially compressed by an information compression module 11. Thus, the images 10 of the sequence to be analyzed, for example with a resolution of 400 columns by 625 lines, are reduced to compressed images (or "imagettes") 12, for example with a definition of 20 by 20 pixels. This computation is done in real time whenever each new image occurs, i.e. for example, for the video rate, at every 1/25 second.

The information compression module 11 is not an obligatory element of the invention. Its only purpose is to reduce the quantity of information to be processed. However, this leads to a loss of discrimination as compared with the initial images.

The invention includes, chiefly, two cascaded correlation modules, respectively performing a spatial recognition of each image or "imagette" 12, then a temporal recognition of the series of images 16.

The first correlation module 13, working at the same rate as the compression module 11, computes the correlation of each compressed image 12 with a reference mask 14. The computation algorithm, as well as the mode by which the learning module 15 prepares the reference mask are specified hereinafter.

This processing operation gives a temporal series 16: the series of the correlations of the compressed images 12 with the reference mask 14. A second correlation module 17 makes the comparison between the temporal series 16 and the reference sequence 18, obtained from the sequence 19 to be detected. The result of this computation, which is done every 1/25 second, gives the degree of similarity 20 between the observed current sequence of images and the sequence to be recognized.

A threshold-checking module 21 compares this degree of similarity 20 with a threshold 22, in such a way as to decide on the recognition or non-recognition of the desired sequence. The current sequence will be considered to be recognized when the degree of similarity $S(t)$20 is below the given threshold $S_{threshold}$22.

The threshold 22 used may be fixed or variable, notably as a function of the permissible noise level.

Any transforming function $S(t)$ may be used. In this case, a module 23 for computing the threshold level determines the value of the threshold 22 to be applied. This may be useful for several purposes such as the reduction in the dynamic range at output, the detection of the recognition of the sequence on a maximum signal or binary signal, etc. A possible transformation is, for example:

$$S(t) \rightarrow \log(1 - S(t)/S_{max})$$

where $S_{max}$ is the maximum possible value of $S(t)$.

The device presented may be extended to the search for several sequences of images. In this case, the two correlation modules 13 and/or 17 are duplicated as many times as there are sequences to be recognized.

In practice, a spatial correlation module 13 and a temporal correlation module 17 are sufficient, and the masks and the reference sequences corresponding to each sequence to be recognized are selectively used.

FIG. 2 shows the processing operation carried out on each image 30. The image 30 is compressed in a sub-image 31, with the group of pixels 32 corresponding to the pixel 33 of the compressed image 31. This compressed image 31 is then correlated with the mask 34. The value 35 of the correlation is all the greater as the compressed image 31 is different from the mask 34. The series 36 of the correlation values 35 is correlated with the reference sequence: this therefore corresponds to a measurement on a sliding window 37.

From the mathematical point of view, the processing may be separated into three steps: the compression of the image, correlation with a mask and correlation with a reference sequence.

The compression of the image may be obtained by the following equation, corresponding to an average-computing operation, for each pixel i of the compressed image:

$$X_i^t = \frac{1}{N} \cdot \sum_{j=1}^{N} w_{i,j} \cdot Im_{f(i,j)}^t \qquad (1)$$

where:

$IM_j^t$ is the $j^{th}$ pixel of the initial (uncompressed image at the instant t $X_i^t$ is the $i^{th}$ pixel of the compressed image at the instant t $w_{i,j}$ are coefficients applied during the weighting. The simplest case is the one where $w_{i,j}=1$ for any i,j, but any other weighting window may also be applied. f(i,j) defines the neighborhood of the pixels on which the weighting is done to obtain the pixel i of the compressed image.

N is the number of pixels on which the weighting, i.e. the compression, is done.

The step of correlation with a mask is determined by:

$$Y^t = N_1(|X^t\rangle - |F\rangle) \qquad (2)$$

where $Y^t$ is the correlation (in the sense of an at-least norm in the vicinity of the "imagettes" to be detected) of $X_i^t$ with $F_i$.

$|X^t\rangle, |F\rangle$ are the vector notations corresponding to:

$X_i^t$ and $F_i$, the mask applied to the compressed images, $N_1(.)$ represents an at-least norm in a vicinity of the "imagettes" of the sequence:

$$|X_0^1\rangle - |F\rangle, |X_0^2\rangle - |F\rangle, \ldots, |X_0^T\rangle - |F\rangle.$$

T being the number of images forming the sequence.

The third step corresponds to the equation $$S(t) = N_2(Y(t) - h) \quad (3)$$

where S(t) represents the output of the system at the instant t.

Y(t) is the vector notation corresponding to $(Y^{t+1-T}, \ldots Y^t)$, h is the vector notation corresponding to $(h^1, h^2, \ldots, h^T)$, More precisely, if $$|X_0^1\rangle, |X_0^2\rangle, \ldots, |X_0^T\rangle$$

represent the T "imagettes" of the sub-sequence to be detected (themselves computed from T images); $h^1, h^2, \ldots, h^T$, represent the outputs $$Y_0^1, Y_0^2, \ldots Y_0^T$$

obtained on this sequence with the mask $|F\rangle$. $N_2$ represents a norm

The goal to be achieved is the detection of a sequence of images known a priori. An appropriate measurement of the correlation, in the broad sense of the term, between the sequence to be detected and the observed sequence, is therefore a norm rather than a scalar product as is generally used for the measurement of correlations.

In this case, the device of the invention uses a non-linear cascaded processing. These leads to more efficient computations. The invention has the advantage of reducing the number of computations to be performed, making it possible to carry out squaring operations corresponding to the norms in real time.

The norms $N_1$ and $N_2$ may advantageously be Euclidean norms.

These norms make it possible to minimize the number of image sequences that would give the same temporal series $Y^t$, once they are correlated with the reference filter, and to provide efficient resistance to noise.

In this case, the equations (2) and (3) are respectively written as follows:

$$Y^t = \sum_{i=1}^{M} (F_i - X_i^t)^2$$

where M is the number of pixels of the compressed image $|X^t\rangle$, and $$S(t) \sum_{l=1}^{T} (Y^{t+l-T} - h^l)^2$$

The working of the recognition devices requires a learning process for the two correlation modules, using the sequence of images to be recognized. It is notably possible to use the following two learning rules:

$$F_i = \frac{1}{T} \sum_{l=1}^{T} Xa_i^l$$

$$h^p = Ya^p = \sum_{i=1}^{M} (F_i - Xa_i^l)^2$$

where $Xa_i^l$ is the pixel i of the image 1 of the sequence to be detected.

The simplicity of these learning rules enables the making of programmable systems, i.e. systems that enable the speedy and simple changing of the sequence or sequences to be identified.

It is also possible to use other learning rules making it possible, at the cost of a computation of variable complexity, to obtain a mask and a sequence of references that are more efficient, i.e. that minimize the number of cases of false recognition.

Since the number of coefficients that have to be memorized is limited, it is possible to use several masks and sequences of references, and hence to search for several series of images without requiring a substantial memory size.

With a device such as this, a mask $|F\rangle$ with a size of 20×20 pixels encoded on a byte corresponds to a 400-byte memory. If the duration of the analyzed sequence is two seconds, the memory needed to store the coefficients h is 100 bytes if they are encoded on two bytes. On the whole, therefore, this necessitates a 500-byte memory.

The computing power needed is, in this case: nb.(M+T).N where nb is the number of elementary operations, T is the number of images in the sequence to be detected, N is the number of images per second and M is the number of pixels of the compressed image.

In the case of a 400-pixel compressed image, produced at a rate of 25 per second, and for a two-second sequence to be detected, the number of elementary operations being equal to 3, the necessary computation power is: 33,000 operations/s. This does not call for a high-capacity processor, and may therefore be incorporated into a low-cost system for mass consumption.

The image compression is not taken into account in the computation. Specialized circuits, such as those set up in the mass consumption recording devices enabling image overlays, can be used to fulfil this function.

Thus, the device of the invention enables high-level performance characteristics in terms of discrimination while, at the same time, requiring only low computation power and little memory.

Many other embodiments of the invention can be envisaged. Thus, it is possible to use other known computation techniques, both for the correlation of the image with the mask and for the correlation of the current sequence with the reference sequence.

The invention is not restricted to the detection of video images. In particular, it has numerous applications in robotics. For example, it can be used for the classification of objects filing past on a conveyor belt and filmed by a fixed camera.

In this case, several sequences are sought, corresponding to each of the objects to be classified. It is then possible to use specific correlation and learning means, taking account notably of the properties of invariance by rotation, in order to identify the object irrespectively of its position.

Another application of the invention in robotics lies in the detection of dysfunctioning. Thus, in the case of a robot that always performs the same task, the sequence to be recognized corresponds to the sequence of actions carried out by the robot. So long as there is no fault, the recognition is always made. Once the output value 20 of the second correlator goes beyond a certain threshold, the device of the invention reports a malfunctioning of the robot.

These applications in the field of robotics have the advantage of costing little, especially in comparison with the specialized image processing systems. The device of the invention may be incorporated, for example, into a standard type of microcomputer coupled to a camera.

More generally, any sequence of multidimensional signals may be profitably processed by the device of the invention, notably the time-frequency spectra of acoustic signals, multisensor signals or radar signals. In this case, the vectors constituting these signals undergo processing identical to the one described for the images of a video signal.

What is claimed is:

1. A device for recognizing sequences in a signal to be analyzed wherein said signal to be analyzed is produced continuously and is constituted by multi-dimensional vectors, said device comprising, for each of said sequences to be recognized;

means for providing sequence vectors representing said sequence to be recognized;

means for providing a masking vector determined from said sequence vectors;

first means for correlating of said multi-dimensional vectors constituting said signal to be analyzed with said produced masking vector wherein the output of said first means for correlation provides a series of values corresponding to the degree of similarity of said multi-dimensional vectors representing said signal with said masking vector;

reference sequence producing means for providing a reference sequence determined from said vectors forming said sequence to be recognized;

second correlation means for correlating a sequence of said series of values with said reference sequence whereby said second correlation means produces values corresponding to the degree of similarity of said series of values and said reference sequence; and means for deciding on the validity of the recognition, by comparison of said values corresponding to the degree of similarity of said series of values and said reference sequence with a threshold value.

2. A device according to claim 1, wherein said vectors representing said signal are provided by an information compression means, from said multi-dimensional vectors of said signal.

3. A device according to claim 2, wherein said information compression means includes means for providing average values.

4. A device according to claim 1, wherein the first correlation means and/or the second correlation means include means for the computation of an Euclidean norm.

5. A device according to claim 1, including means for the adapting of said threshold value to the permissible noise level.

6. A device according to claim 1, including means for the transformation of said degree of similarity, for example as a function of the maximum threshold value.

7. A device according to claim 1, including means for the determining of said masking vector and/or said reference sequence, using a learning rule that minimizes the resistance to noise.

8. A device according to claim 7, wherein said means for the determining of said masking vector include means to obtain the average of said vectors representing said sequence to be recognized, and wherein said means for the determining of said reference sequence include means for the correlation of each of said vectors representing said sequence to be recognized with said masking vector.

* * * * *